United States Patent [19]
Kanamine et al.

[11] Patent Number: 5,792,546
[45] Date of Patent: Aug. 11, 1998

[54] MAGNETO-RESISTIVE HEAD AND METHOD OF PRODUCING THE SAME

[75] Inventors: Michiaki Kanamine; Hitoshi Kanai; Junichi Kane; Junzo Toda; Yuji Uehara, all of Kawasaki, Japan

[73] Assignee: Fujitsu Limited, Kawasaki, Japan

[21] Appl. No.: 289,204

[22] Filed: Aug. 12, 1994

[30] Foreign Application Priority Data

Nov. 22, 1993 [JP] Japan ................................ 5-292195

[51] Int. Cl.$^6$ ........................................................ G11B 5/66
[52] U.S. Cl. .................. 428/212; 428/213; 428/694 R; 428/694 T; 428/694 TS; 428/694 TM; 428/694 TR; 428/900; 360/110; 360/113; 324/252; 148/100
[58] Field of Search .................. 148/100; 324/252; 360/110, 113; 428/694 R, 694 T, 694 TM, 213, 212, 900, 694 TS, 69 TR

[56] References Cited

U.S. PATENT DOCUMENTS

| | | | |
|---|---|---|---|
| 3,908,194 | 9/1975 | Romankiw | 360/113 |
| 4,785,366 | 11/1988 | Krounbi et al. | 360/113 |
| 4,918,554 | 4/1990 | Bajorek et al. | 360/113 |

FOREIGN PATENT DOCUMENTS

| | | |
|---|---|---|
| 0483373 | 6/1992 | European Pat. Off. |
| 55-25886 | 2/1980 | Japan |
| 60-239911 | 11/1985 | Japan |
| 61-248213 | 11/1986 | Japan |
| 62-132211 | 6/1987 | Japan |
| 1-119913 | 5/1989 | Japan |
| 2-116009 | 4/1990 | Japan |
| 2-203412 | 8/1990 | Japan |
| 4-123307 | 4/1992 | Japan |
| 5-62130 | 3/1993 | Japan |
| 5-266434 | 10/1993 | Japan |

*Primary Examiner*—Leszek Kiliman
*Attorney, Agent, or Firm*—Armstrong, Westerman, Hattori, McLeland & Naughton

[57] ABSTRACT

A magneto-resistive head is provided with a substrate, a lower shield layer made of a Fe-system magnetic material and provided above the substrate, and a non-magnetic insulator layer provided above the lower shield layer. The non-magnetic insulator layer has a function of suppressing deterioration of surface roughness of the lower shield layer when subjected to an annealing process under a magnetic field in order to improve magnetic characteristics of the lower shield layer to desired magnetic characteristics.

14 Claims, 10 Drawing Sheets

MAGNETO-RESISTIVE HEAD AND METHOD OF PRODUCING THE SAME

BACKGROUND OF THE INVENTION

The present invention generally relates to magneto-resistive heads and methods of producing the same, and more particularly to a magneto-resistive head which is used in a magnetic disk unit or the like and to a method of producing such a magneto-resistive head.

Recently, magnetic disk units are used as mass storages, that is, external storage units of computers. For this reason, there are demands to realize high-performance magnetic heads. It is expected that such demands can be satisfied by a recording and reproducing composite head integrally having a magneto-resistive head exclusively for reproduction and an inductive head exclusively for recording. The magneto-resistive head is also sometimes referred to as a MR head.

Figure 1A:
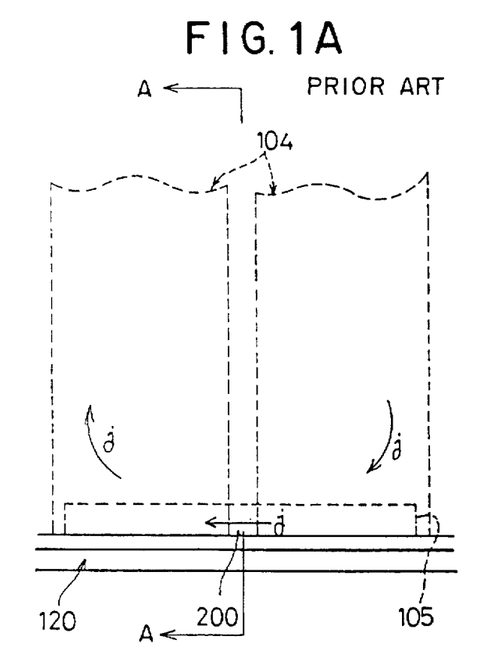
FIGS. 1A, 1B and 1C respectively are a front view, a cross sectional view and a bottom view showing an example of a conventional magneto-resistive head.
Figure 1B:
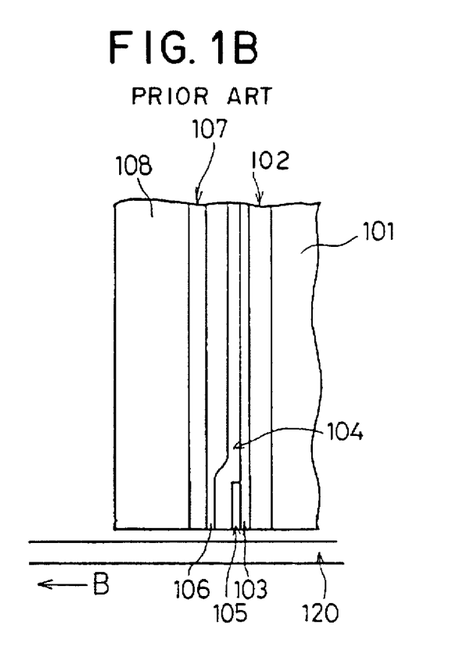
Figure 1C:
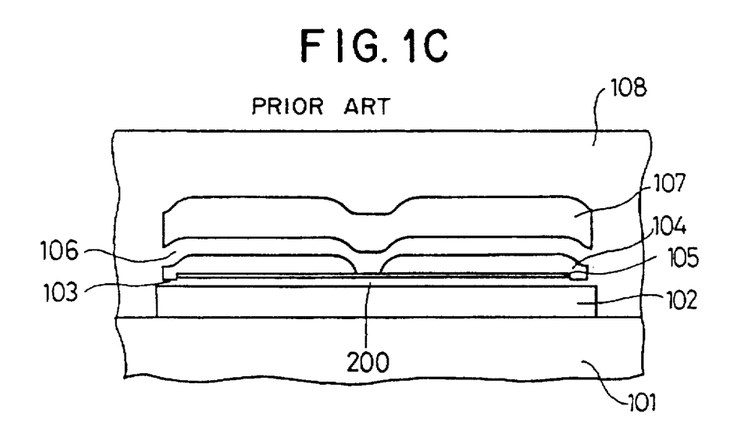

FIGS. 1A through 1C show an example of a conventional magneto-resistive head. FIG. 1A shows a front view of the conventional magneto-resistive head, FIG. 1B shows a cross section of this conventional magneto-resistive head, and FIG. 1C shows a bottom view of this conventional magneto-resistive head.

As shown particularly in FIGS. 1A and 1B, the conventional magneto-resistive head generally includes a substrate 101, a lower shield layer 102, a first gap layer 103, a pair of conductor layers 104 on the right and left, a magneto-resistive element 105, a second gap layer 106, an upper shield layer 107, and an insulating protection layer 108. FIGS. 1A and 1B also show a magnetic recording medium 120 which relatively moves in a direction B with respect to the magneto-resistive head. FIG. 1B shows the cross section along a line A—A in FIG. 1A. A signal sensing region 200 is defined between the pair of conductor layers 104, and a sense current j flows as indicated by an arrow in FIG. 1A.

The upper and lower shield layers 107 and 102 are made of a magnetic material such as permalloy (NiFe) having a high high-frequency permeability. However, since permalloy is a material having a relatively low hardness, the upper and lower shield layers 107 and 102 may be stretched in the moving direction of the magnetic recording medium 120 when the magneto-resistive head makes sliding contact with the surface of the moving magnetic recording medium 120 for a long period of time. As a result, there is a problem in that a short-circuiting may occur between the stretched or extended portion of the lower shield layer 102 and the magneto-resistive element 105 and the conductor layer 104.

Permalloy (NiFe) is also used as the upper and lower magnetic poles of a thin film magnetic head, and the above described stretched or extended portion is also generated similarly to the magneto-resistive head. For this reason, a short-circuiting of the upper and lower magnetic poles may occur in the thin film magnetic head, but there is no problem from the point of view of electrical short-circuiting, and the electrical characteristics of the thin film magnetic head are unaffected unless the short-circuiting occurs to an extremely large extent.

A Japanese Laid-Open Patent Application No. 2-116009 proposes a magneto-resistive head which uses sendust (FeSiAl) for the lower shield layer. The hardness of sendust is greater than that of permalloy.

According to this proposed magneto-resistive head, the problem of electrical short-circuiting of the magneto-resistive element and the lower shield layer can virtually be eliminated. However, when forming the lower shield layer from sendust, an annealing process must be carried out under a magnetic field at a high temperature of 500° C., for example, so that the magnetic characteristics of the lower shield layer is improved to the desired magnetic characteristics.

But when the annealing process is carried out with respect to the magnetic material such as sendust, recrystallization of the magnetic material occurs, thereby introducing the growth of grains at the surface of the lower shield layer. Consequently, the surface roughness of the lower shield layer becomes large.

When the first gap layer is formed on the lower shield layer which has the large surface roughness, irregularities or undulations are formed on the first gap layer. Accordingly, when the magneto-resistive element is formed on the irregular first gap layer, there are problems in that the magnetic characteristics of the magneto-resistive element will deteriorate because irregularities or undulations will also be formed in the magneto-resistive element, and the reproduced output of the magneto-resistive head will become small. In addition, there is also a problem in that magnetic domain walls are generated, thereby causing the so-called Barkhausen noise in the reproduced output of the magneto-resistive head.

SUMMARY OF THE INVENTION

Accordingly, it is a general object of the present invention to provide a novel and useful magneto-resistive head and a method of producing the same, in which the problems described above are eliminated.

Another and more specific object of the present invention is to provide a magneto-resistive head comprising a substrate, a lower shield layer made of a Fe-system magnetic material and provided above the substrate, and a non-magnetic insulator layer provided above the lower shield layer, where the non-magnetic insulator layer has suppression means for suppressing deterioration of surface roughness of the lower shield layer when subjected to an annealing process under a magnetic field in order to improve magnetic characteristics of the lower shield layer to desired magnetic characteristics. According to the magneto-resistive head of the present invention, it is possible to suppress deterioration of the surface roughness of the lower shield layer when subjected to the annealing process. Hence, it is possible to suppress a phenomenon in which grains are grown on the surface of the lower shield layer due to recrystallization. Consequently, it is possible to realize a magneto-resistive head having improved characteristics by preventing deterioration of the magnetic characteristics of a magneto-resistive element which is provided above the lower shield layer and preventing the generation of Barkhausen noise.

Still another object of the present invention is to provide a magneto-resistive head comprising a magneto-resistive layer, an intermediate layer provided on the magneto-resistive layer, a soft magnetic layer provided on the intermediate layer, and at least a pair of magnetic layers contacting the soft magnetic layer and the magneto-resistive layer for controlling magnetic domains. According to the magneto-resistive head of the present invention, it is possible to satisfactorily and simultaneously control the magnetic domain of both the magneto-resistive layer and the soft magnetic layer. As a result, it is possible to effectively suppress the Barkhausen noise which is induced in the magneto-resistive layer due to the magnetic domain structure of the soft magnetic layer.

A further object of the present invention is to provide a method of producing a magneto-resistive head which comprises a substrate and a lower shield layer made of a Fe-system magnetic material, comprising the steps of (a) forming a non-magnetic insulator layer on the lower shield layer, and (b) carrying out an annealing process under a magnetic field to improve magnetic characteristics of the lower shield layer to desired magnetic characteristics at least after carrying out the step (a). According to the method of the present invention, it is possible to realize a magneto-resistive head having improved characteristics by preventing deterioration of the magnetic characteristics of a magneto-resistive element which is provided above the lower shield layer and preventing the generation of Barkhausen noise.

Other objects and further features of the present invention will be apparent from the following detailed description when read in conjunction with the accompanying drawings.

DESCRIPTION OF THE PREFERRED EMBODIMENT

First, a description will be given of the operating principle of the present invention, by referring to FIG. 2.

Figure 2:
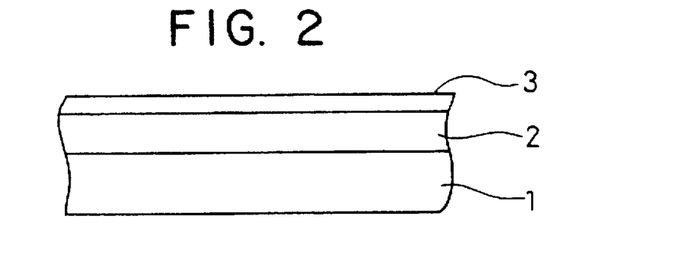
FIG. 2 is a cross sectional view for explaining the operating principle of the present invention.

In FIG. 2, an important part of a magneto-resistive head includes a substrate 1, a lower shield layer 2, and a non-magnetic insulator layer 3. For example, the substrate 1 is made of $Al_2O_3TiC$, and the lower shield layer 2 is made of FeN. By using FeN for the lower shield layer 2, it is possible to obtain desired magnetic characteristics by carrying out an annealing process at a relatively low temperature of approximately 300° C., for example, and this relatively low temperature is also desirable from the point of view of improving the efficiency of the head producing process. Hence, in a best mode of the present invention, FeN is used for the lower shield layer 2. In addition, the non-magnetic insulator layer 3 is made of a material such as $Al_2O_3$, $SiO_2$ and insulative carbon (C), for example.

An annealing process is carried out under a magnetic field in order to improve the magnetic characteristics of the lower shield layer to the desired magnetic characteristics. This annealing process is carried out at least after the non-magnetic insulator layer 3 is formed on the lower shield layer 2.

When the lower shield layer 2 is made of a Fe-system magnetic material such as FeN, the above described stretched or extended portion will not be generated even upon sliding contact with a magnetic recording medium. Accordingly, no electrical short-circuit will occur between the lower shield layer 2 and a magneto-resistive element or the like. In addition, because the annealing process is carried out after the non-magnetic insulator layer 3 is formed on the lower shield layer 2, the surface roughness of the lower shield layer 2 will not become large. In other words, the non-magnetic insulator layer 3 on the lower shield layer 2 functions as a suppression means for suppressing a phenomenon in which grains are grown on the surface of the lower shield layer 2 due to recrystallization.

Therefore, it is possible to realize a magneto-resistive head having improved characteristics by preventing deterioration of the magnetic characteristics of the magneto-resistive element which is provided above the lower shield layer 2 and preventing the generation of Barkhausen noise.

First, a description will be given of a first embodiment of the magneto-resistive head according to the present invention, by referring to FIGS. 3 through 6A and 6B. FIGS. 3 through 6A and 6B respectively show important parts of the magneto-resistive head before carrying out a polishing process to expose a signal sensing region of a magneto-resistive element to the surface of the magnetic recording medium.

Figure 3:
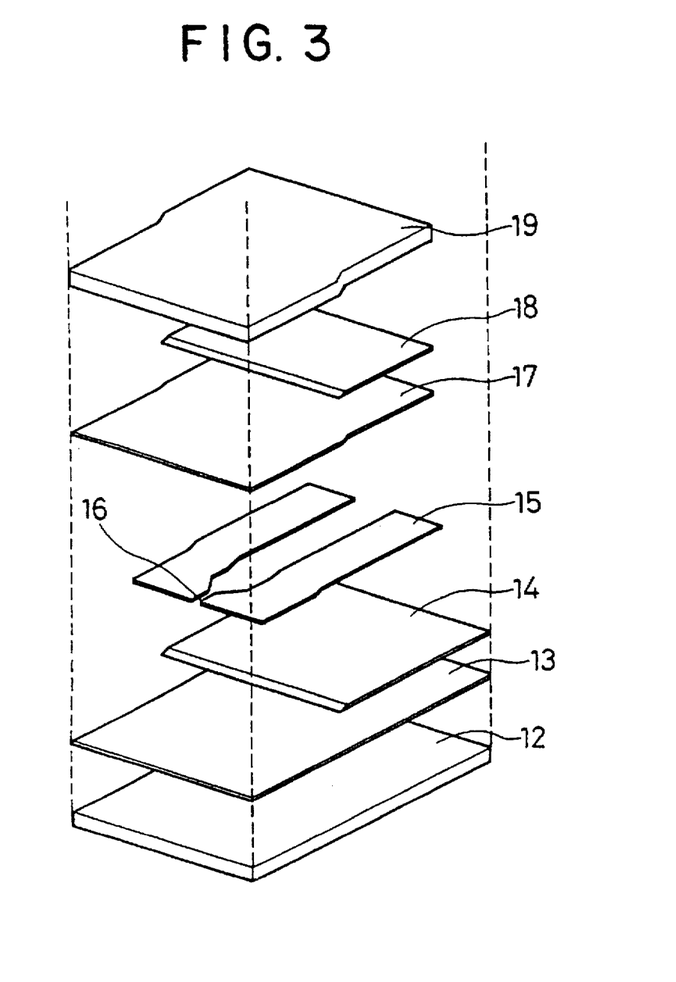
FIG. 3 is a disassembled perspective view showing an important part of a first embodiment of a magneto-resistive head according to the present invention.
Figure 4:
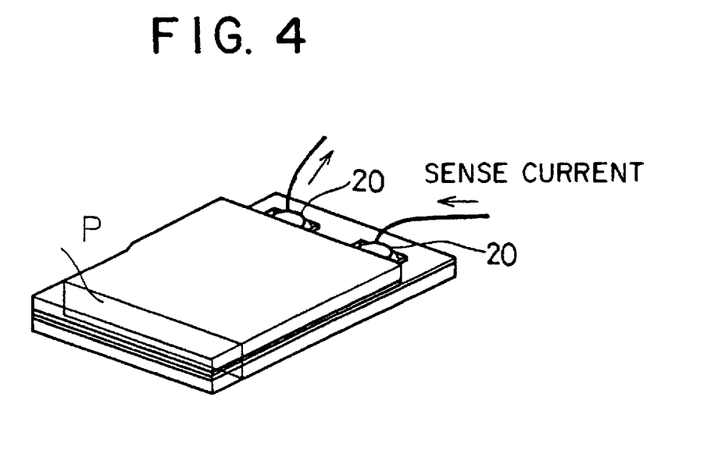
FIG. 4 is a perspective view showing an important part of the first embodiment.
Figure 5:
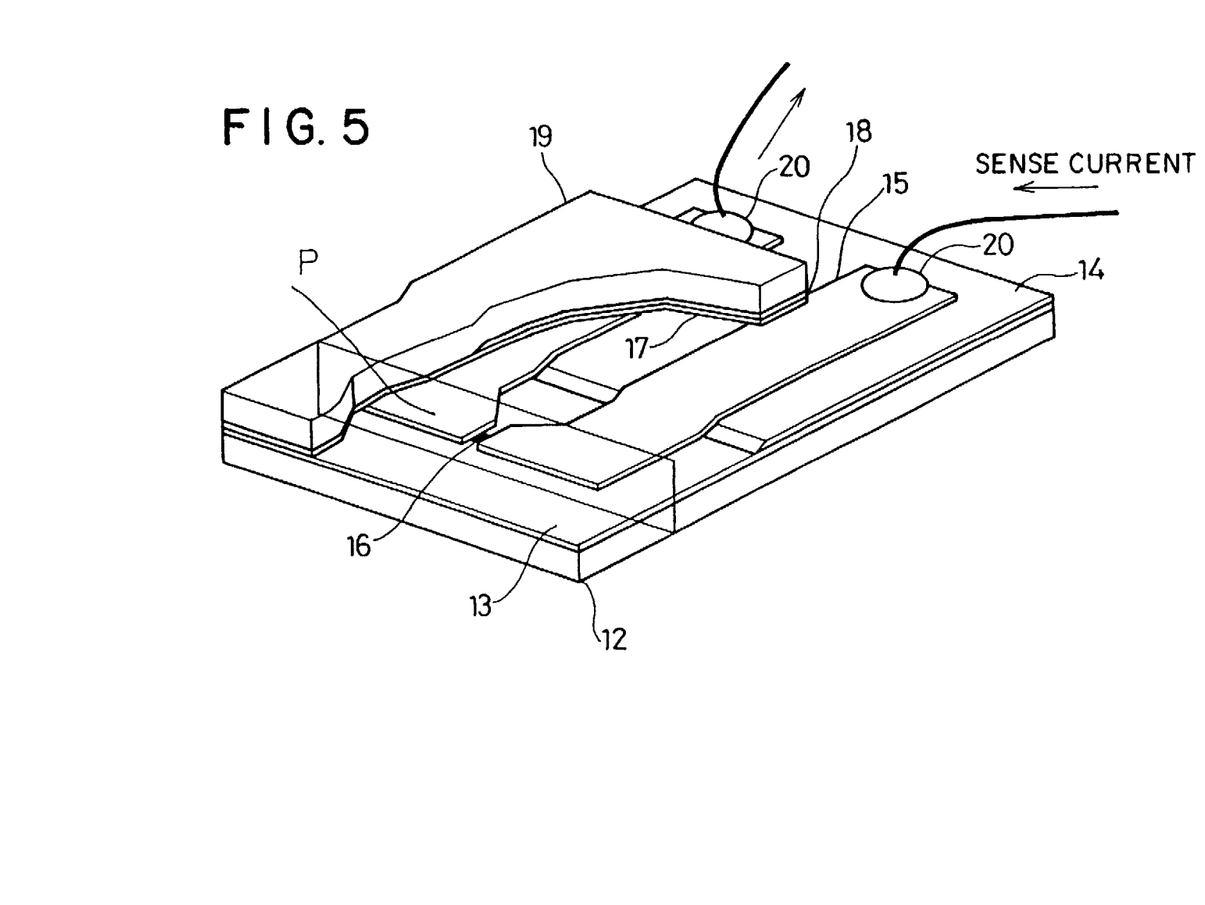
FIG. 5 is a perspective view, on an enlarged scale, showing the first embodiment with a part omitted.

FIG. 3 is a disassembled perspective view showing an important part of the magneto-resistive head, and FIG. 4 is a perspective view showing an important part of the magneto-resistive head. FIG. 5 is a perspective view, on an enlarged scale, showing an important part of the magneto-resistive head with a part omitted. In addition, FIG. 6A is a plan view showing an important part of the magneto-resistive head, and FIG. 6B is a cross sectional view showing the important part of the magneto-resistive head.

As shown in FIGS. 3 through 6A and 6B, this embodiment of the magneto-resistive head generally includes a substrate 11 made of $Al_2O_3TiC$, a lower shield layer 12 made of FeN, a first gap layer 13 made of $Al_2O_3$, a first gap raising layer 14 made of $Al_2O_3$, a pair of conductor layers 15 made of Au, a magneto-resistive (MR) element 16 made of NiFe, a second gap layer 17 made of $Al_2O_3$, a second gap raising layer 18 made of $Al_2O_3$, and an upper shield layer 19 made of NiFe. In this embodiment, the first gap raising layer 14 is formed by carrying out a lift-off process with respect to the first gap layer 13, and thus, the first gap layer 13 and the first gap raising layer 14 may be considered as being a single gap layer. Similarly, the second gap raising layer 18 in this embodiment is formed by carrying out a lift-off process with respect to the second gap layer 17, and thus, the second gap layer 17 and the second gap raising layer 18 may be considered as being a single gap layer.

Figure 6A:
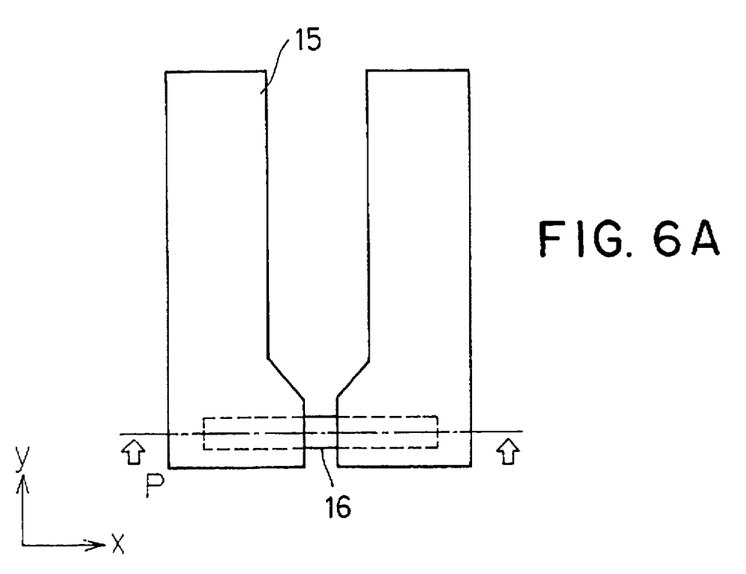
FIGS. 6A and 6B respectively are a plan view and a cross sectional view showing an important part of the first embodiment.

As shown particularly in FIG. 6A, the MR element 16 is patterned into a rectangular shape so that the axis of easy magnetization matches a direction x taken along the longitudinal direction of the MR element 16. The pair of conductor layers 15 is electrically connected to the MR element 16 at an interval of a predetermined width with respect to the longitudinal direction of the MR element 16. The MR element 16 and the conductor layers 15 are arranged between the two shield layers 12 and 19, but the two shield layers 12 and 19 are electrically insulated via the first gap layer 13, the first gap raising layer 14, the second gap layer 17 and the second gap raising layer 18.

Figure 6B:
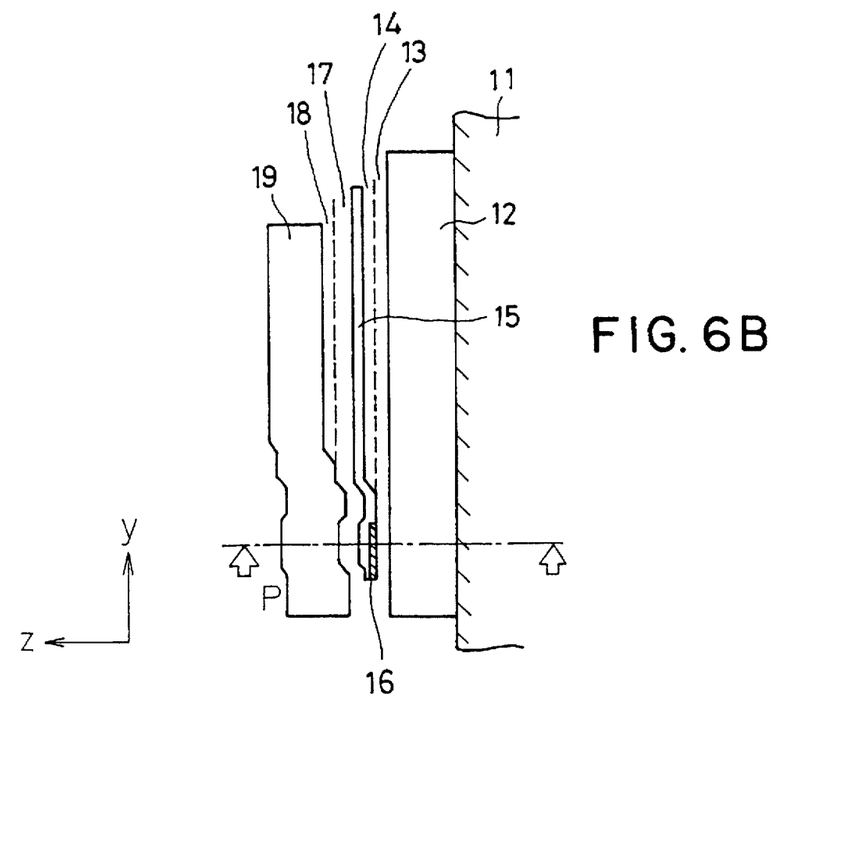

After the above described layers of the magneto-resistive head are formed, the magneto-resistive head is completed by removing the layers to a machined surface P shown in FIGS. 6A and 6B by a known process. The first gap layer 13 forms at least a portion of a reproducing gap of the magneto-resistive head.

As indicated by the arrow in FIGS. 4 and 5, a sense current flows via electrodes 20 provided at end parts of the pair of conductor layers 15.

By arranging the edge of the first gap raising layer 14 and the edge of the second gap raising layer 18 at mutually shifted positions, it is possible to avoid a large stepped portion from being formed at the end of the pattern. When the gap layers provided with the gap raising layers are used, it is possible to make the thicknesses of the gap layers small compared to other parts at least in a vicinity of the MR element 16. Hence, it is possible to make the separation between the two shield layers 12 and 19 narrow, so that a high-resolution magneto-resistive head can be realized. In addition, since the thicknesses of the gap layers at parts other than the vicinity of the MR element 16 are large compared to the thicknesses in the vicinity of the MR element 16, it is possible to positively prevent short-circuiting of the conductor layers 15 and the shield layers 12 and 19.

In this embodiment, the annealing process which is carried out under a magnetic field for the purpose of improving the magnetic characteristics of the lower shield layer 12 to the desired magnetic characteristics is carried out at least after the first gap layer 13 is formed on the lower shield layer 12. As a result, it is possible to suppress the surface roughness of the lower shield layer 12 from becoming large. In other words, the first gap layer 13 on the lower shield layer 12 functions as a suppression means for suppressing the phenomenon in which grains are grown on the surface of the lower shield layer 12 due to recrystallization. Hence, it is possible to realize a magneto-resistive head having improved characteristics by preventing deterioration of the magnetic characteristics of the MR element 16 which is provided above the lower shield layer 12 and preventing the generation of Barkhausen noise. In addition, it is possible to prevent short-circuiting between the lower shield layer 12 and the MR element 16 and the conductor layers 15.

As described above, the first gap layer 13 on the lower shield layer 12 functions as the suppression means for suppressing the phenomenon in which grains are grown on the surface of the lower shield layer 12 due to recrystallization. This first gap layer 13, may have the form of a single non-magnetic insulator layer which includes the first gap raising layer 14 or, have a multi-layer structure. In the case of the first gap layer 13 having the multi-layer structure, a non-magnetic insulator layer which functions as the above suppression means is provided on the lower shield layer 12, and one or more gap layers which substantially function as the first gap layer 14 are provided on this non-magnetic insulator layer.

Of course, the first and second gap raising layers 14 and 18 are not essential elements of the present invention, and may be omitted.

Next, a description will be given of an embodiment of a method of producing the magneto-resistive head according to the present invention, by referring to FIGS. 7A through 7C. For the sake of convenience, it is assumed that this embodiment of the method produces the first embodiment of the magneto-resistive head shown in FIGS. 3 through 6A and 6B described above.

Figure 7A:
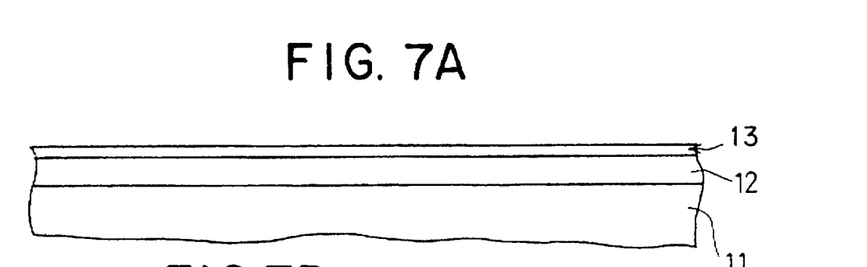
FIGS. 7A, 7B and 7C respectively are cross sectional views for explaining an embodiment of a method of producing a magneto-resistive head according to the present invention.

First, as shown in FIG. 7A, the lower shield layer 12 made of FeN is formed on the substrate 11 made of $Al_2O_3TiC$ by a sputtering process to a thickness of 3 µm, for example. Then, the first gap layer 13 made of $Al_2O_3$ is formed on the lower shield layer 12 by a sputtering process to a thickness of 0.3 µm, for example. Thereafter, in order to improve the magnetic characteristics of the lower shield layer 12 to the desired magnetic characteristics, an annealing process is carried out with respect to the structure shown in FIG. 7A under a magnetic field at a temperature of 250° C. to 350° C., for example. In FIGS. 7A through 7C, the illustration of the first gap raising layer 14 is omitted.

Figure 7B:
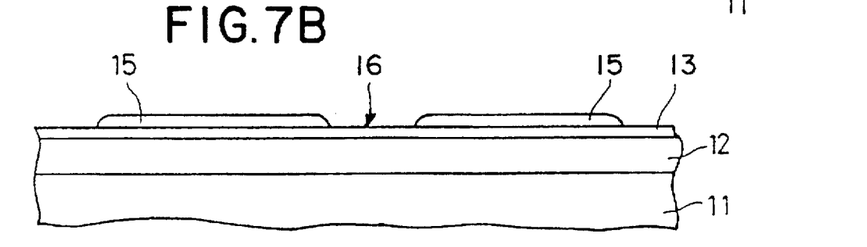

Next, the MR element 16 is formed on the first gap layer 13, and as shown in FIG. 7B, the conductor layers 15 made of Au are formed on the first gap layer 13.

Figure 7C:
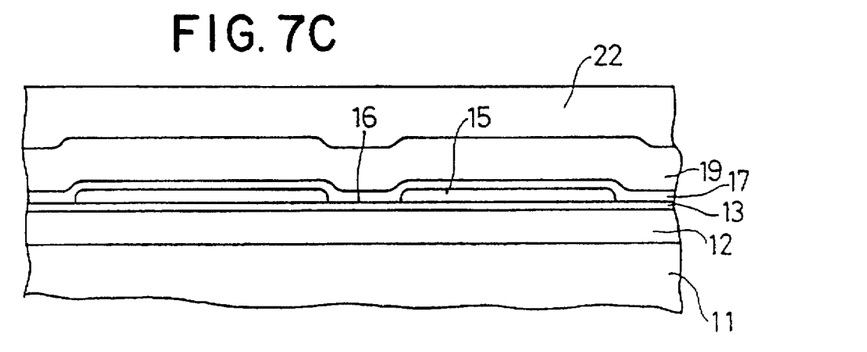

Thereafter, as shown in FIG. 7C, the second gap layer 17 made of $Al_2O_3$ is formed on the structure shown in FIG. 7B by a sputtering process to a thickness of 0.3 µm, for example. In FIG. 7C, the illustration of the second gap raising layer 18 is omitted. The upper shield layer 19 made of NiFe is formed on the second gap layer 17 by a sputtering process to a thickness of 3 µm, for example. Furthermore, the insulating protection layer 22 made of $Al_2O_3$ is formed on the upper shield layer 19 by a sputtering process to a thickness of 15 µm, for example. As a result, the magneto-resistive head shown in FIG. 7C is obtained.

Figure 8:
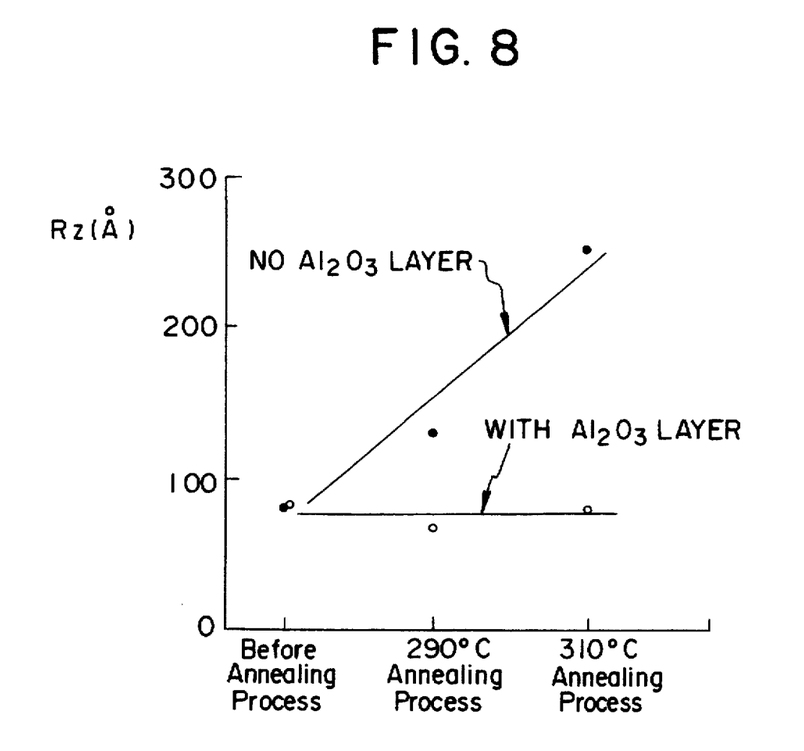
FIG. 8 is a graph showing an annealing process dependency of the surface roughness of a lower shield layer.

FIG. 8 is a graph showing an annealing process dependency of the surface roughness of the lower shield layer 12. More particularly, FIG. 8 shows an Rz value (Å) which is an average of the surface roughness of the lower shield layer 13 measured at 10 points, for a case where the annealing process is carried out after providing the $Al_2O_3$ first gap layer 13 which has a thickness of 0.2 µm and functions as the suppression means, and for a case where the annealing process is carried out without the first gap layer 13, where the FeN lower shield layer 12 has a thickness of 1.5 µm. In FIG. 8, the white circular marks indicate the measured results for the case where the annealing process is carried out after providing the first gap layer 13, and the black circular marks indicate the measured results for the case where the annealing process is carried out with respect to the lower shield layer 12 without providing the first gap layer 13. As clearly seen from FIG. 8, the surface roughness of the lower shield layer 12 before and after the annealing process virtually does not change when the suppression means is provided.

Of course, the materials of the substrate and each of the layers forming the magneto-resistive head are not limited to those of the above described embodiments. For example, the material used for the lower shield layer 12 and the upper shield layer 19 is not limited to FeN, and various Fe-system magnetic materials may be used. In addition, various non-magnetic insulative materials may be used for the first gap layer 13 (and the second gap layer 17) which functions as the suppression means. That is, the first gap layer 13 (and the second gap layer 17) may be made of non-magnetic insulative materials such as $Al_2O_3$, $SiO_2$ and insulative carbon (C).

The present invention is also applicable to a composite head integrally having the magneto-resistive head and an inductive head for recording in a stacked arrangement.

Figure 9:
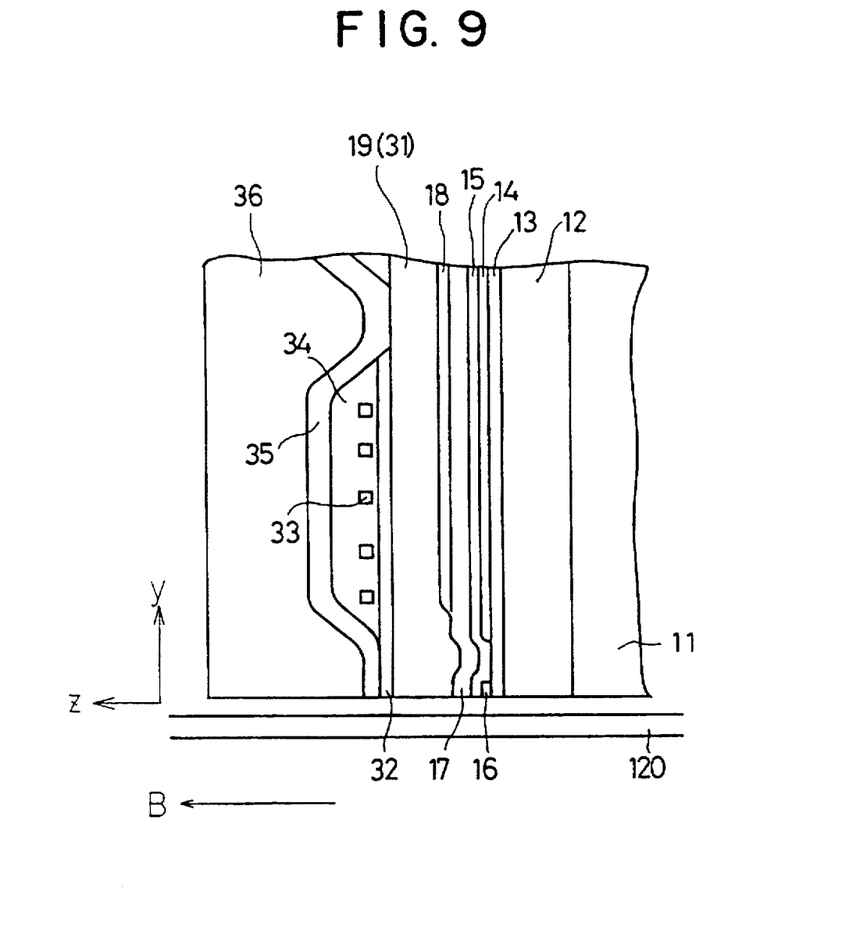
FIG. 9 is a cross sectional view showing an important part of a second embodiment of the magneto-resistive head according to the present invention.

FIG. 9 is a cross sectional view showing an important part of a second embodiment of the magneto-resistive head according to the present invention. In this embodiment, the present invention is applied to the composite head. In FIG. 9, those parts which are the same as those corresponding parts in FIGS. 3 through 7A, 7B and 7C are designated by the same reference numerals, and a description thereof will be omitted.

The composite head shown in FIG. 9 includes a magneto-resistive head part and an inductive head part for recording. The magneto-resistive head part includes a substrate 11, a lower shield layer 12, a first gap layer 13, a first gap raising layer 14, conductor layers 15, a MR element 16, a second gap layer 17, a second gap raising layer 18, and an upper shield layer 19. Accordingly, the construction of the magneto-resistive head part is substantially the same as that of the first embodiment of the magneto-resistive head described above.

On the other hand, the inductive head part for recording includes a lower magnetic pole 31 which is used in common with the upper shield layer 19 of the magneto-resistive head part, a recording gap layer 32, a coil 33, an interlayer insulator 34, and an upper magnetic pole 35. In this embodiment, an insulative protection layer 36 is provided on the top surface of the upper magnetic pole 35.

Of course, the lower magnetic pole 31 which is used in common with the upper shield layer 19 may be made of FeN, and a non-magnetic insulator layer which functions as the suppression means may be provided on this upper shield layer 19 which is used in common as the lower magnetic pole 31. By providing the non-magnetic insulator layer, it is possible to reduce the surface roughness of the upper shield layer 19 when the annealing process is carried out under the magnetic field for the purpose of improving the magnetic characteristics of the upper shield layer 19 to the desired magnetic characteristics, similarly to the case of the first embodiment of the magneto-resistive head described above. Hence, it is possible to reduce the irregularities of the layer which is formed on the upper shield layer 19.

Figure 10:
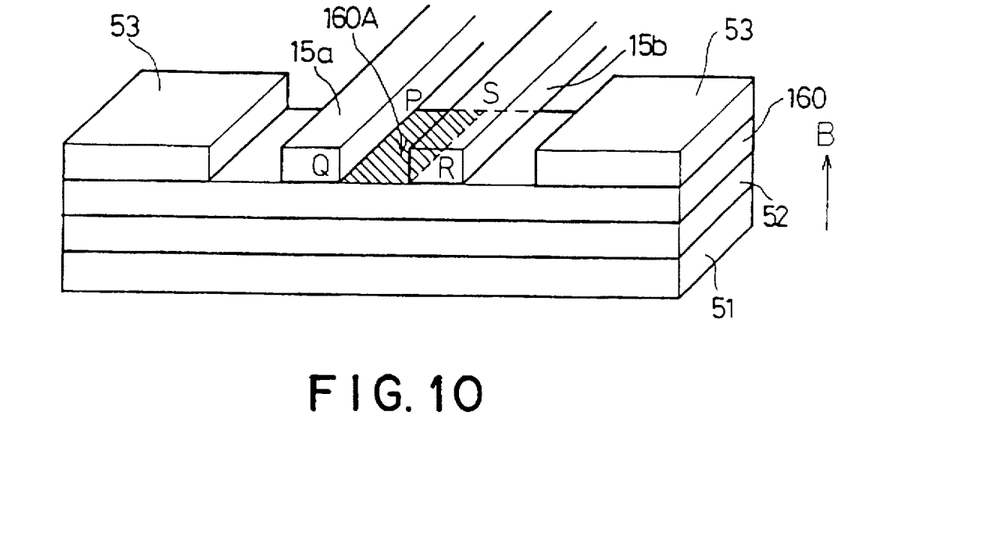
FIG. 10 is a perspective view for explaining the problems of a magnetic domain control.

The MR element part of the magneto-resistive head has a construction show in FIG. 10, for example. FIG. 10 corresponds to a view taken in the direction y in FIG. 6A, and an arrow B in FIG. 10 indicates the moving direction of the magnetic recording medium (not shown) arranged at the bottom of the magneto-resistive head. A non-magnetic conductor layer 52 is provided on a soft magnetic layer 51, and a MR layer 160 having a rectangular pattern is provided on the non-magnetic conductor layer 52. Narrow pieces 15a and 15b of the conductor layers 15 are connected at both ends of the MR layer 160, so that a sense current flows to the MR layer 160.

In FIG. 10, when a signal magnetic field from the magnetic recording medium is input to a signal sensing region 160A indicated by the hatching, the electrical resistance of a rectangular portion PQRS changes, and the voltage across the ends of the MR layer 160 changes. This voltage change is detected as the output of the magneto-resistive head. In this state, in order to obtain a linear output from the MR element 16, the soft magnetic layer 51 connects to the MR layer 160 via the non-magnetic conductor layer 52, and the magnetization of the soft magnetic layer 51 is saturated by the magnetic field of the sense current, so that a lateral bias magnetic field is applied to the MR layer 160 by the magnetic field generated by this saturation magnetization. Furthermore, in order to suppress the Barkhausen noise by making the MR layer 160 have a single magnetic domain, magnetic layers 53 for controlling the magnetic domain and made of FeMn, for example, are provided on end parts of the MR layer 160.

However, since the magnetic domain of the soft magnetic layer 51 is not controlled, the magnetic domain walls of the soft magnetic layer 51 undergo discontinuous motion when the signal magnetic field from the magnetic recording medium is input to the magneto-resistive head. As a result, the magnetic domain behavior of the MR layer 160 becomes unstable, and consequently the Barkhausen noise is induced.

Figure 11:
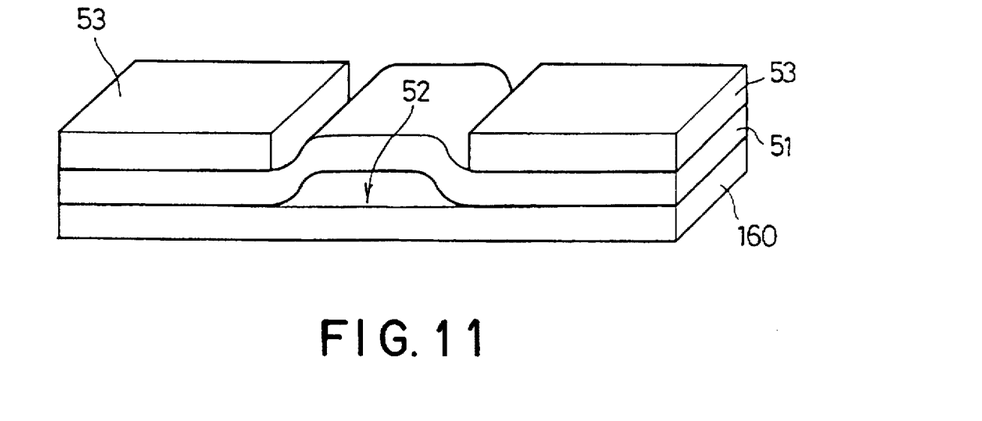
FIG. 11 is a perspective view for explaining the problems of another magnetic domain control.

With respect to this problem, a magneto-resistive head having a construction shown in FIG. 11 was previously proposed in a Japanese Laid-Open Patent Application No.1-119913. In FIG. 11, those parts which are the same as those corresponding parts in FIG. 10 are designated by the same reference numerals, and a description thereof will be omitted.

According to the magneto-resistive head shown in FIG. 11, only the central portion of the MR layer 160 connects to the soft magnetic layer 51 via the non-magnetic conductor layer 52. In addition, the magnetic layers 53 for controlling the magnetic domain are arranged on both sides of the soft magnetic layer 51, so as to simultaneously control the magnetic domains of the MR layer 160 and the soft magnetic layer 51.

However, even according to the construction shown in FIG. 11, the MR layer 160 and the magnetic layers 53 for controlling the magnetic domain do not make direct contact. For this reason, the magnetic domain of the MR layer 160 cannot be controlled sufficiently, and there is a possibility that the Barkhausen noise will be generated.

Figure 12:
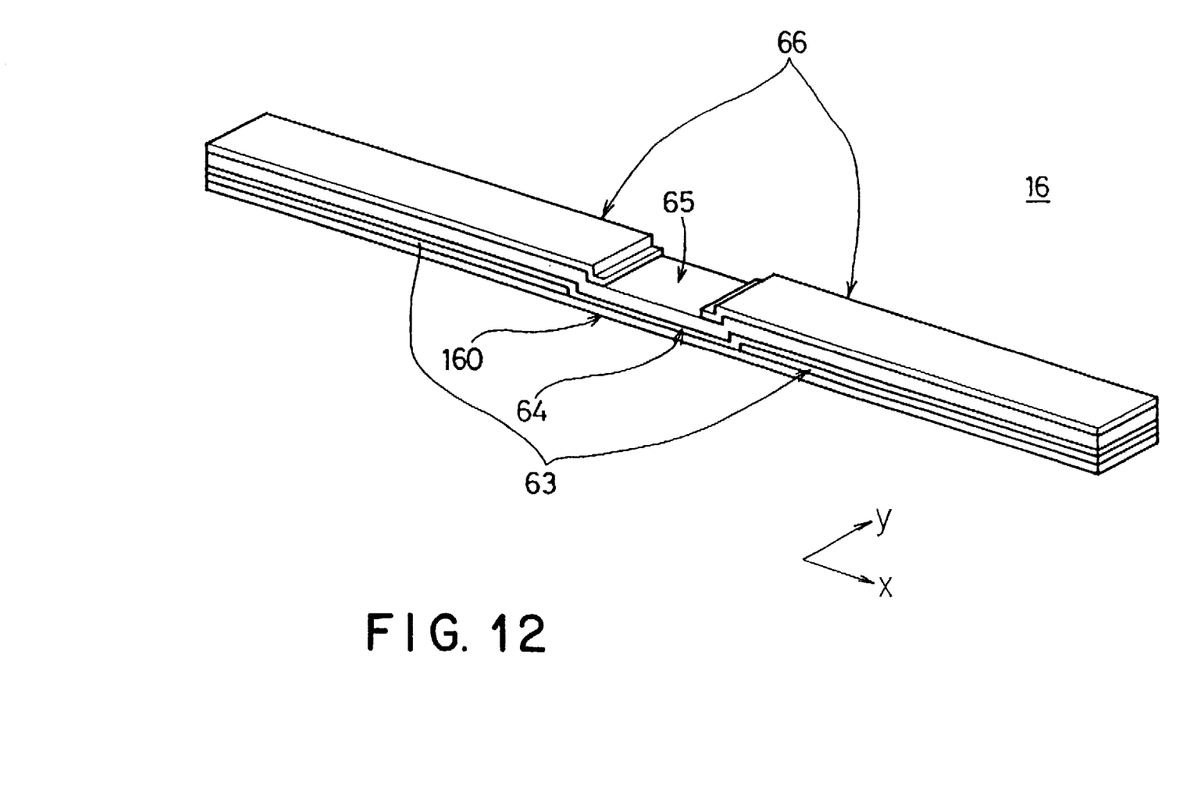
FIG. 12 is a perspective view showing an important part of a third embodiment of the magneto-resistive head according to the present invention.

Accordingly, a description will now be given of a third embodiment of the magneto-resistive head according to the present invention which can satisfactorily control the magnetic domain. FIG. 12 is an enlarged view showing a MR element part of the third embodiment.

In FIG. 12, magnetic layers 63 for controlling the magnetic domain are made of FeMn, for example. These magnetic layers 63 are arranged on both ends of a MR layer 160. An intermediate layer 64 made of a non-magnetic conductor such as Ta, and a soft magnetic layer 65 made of NiFeCr, for example, are stacked on the MR layer 160 and the magnetic layers 63. Magnetic layers 66 for controlling the magnetic domain are made of FeMn, for example. These magnetic layers 66 are arranged on both ends of the soft magnetic layer 65. Narrow pieces of the conductor layers 15 which are not shown in FIG. 12, are provided on the soft magnetic layer 65 between the two magnetic layers 66, similarly as in the case of the narrow pieces 15a and 15b shown in FIG. 10.

The soft magnetic layer 65 has stepped portions. Hence, the magnetic domain structure may be formed in the soft magnetic layer 65 due to the stepped portions and there is a possibility that the Barkhausen noise will be generated thereby. For this reason, it is desirable that the stepped portions of the soft magnetic layer 65 are covered by the magnetic layers 66 as shown in FIG. 12. In this case, the effect of suppressing the Barkhausen noise is greater when the interval of the magnetic layers 66 on the soft magnetic layer 65 is narrower than the interval of the magnetic layers 63 on the MR layer 160.

For example, the magnetic layers 63 and 66 for controlling the magnetic domain may be made of FeMn when an antiferromagnetic material is used, TbCo when a ferrimagnetic material is used, and $SmCo_5$ when a permanent magnet material is used.

According to this embodiment, both the MR layer 160 and the soft magnetic layer 65 make direct contact with the magnetic layers 63 or 66. For this reason, it is possible to satisfactorily and simultaneously control the magnetic domain of both the MR layer 160 and the soft magnetic layer 65. As a result, it is possible to effectively suppress the Barkhausen noise which is induced in the MR layer 160 due to the magnetic domain structure of the soft magnetic layer 65.

Further, the present invention is not limited to these embodiments, but various variations and modifications may be made without departing from the scope of the present invention.

What is claimed is:

1. A magneto-resistive head comprising:

a substrate having a top surface;

a non-magnetic insulator layer which is electrically insulative; and a lower shield layer made of a Fe-containing magnetic material and provided between the non-magnetic insulator layer and the top surface of said substrate;

said non-magnetic insulator layer having suppression means for suppressing deterioration of surface roughness of said lower shield layer when subjected to an annealing process under a magnetic field in order to improve magnetic characteristics of said lower shield layer to desired magnetic characteristics.

2. The magneto-resistive head as claimed in claim 1, wherein said lower shield layer is made of FeN.

3. The magneto-resistive head as claimed in claim 1, wherein said non-magnetic insulator layer is made of a non-magnetic material selected from a group consisting of $Al_2O_3$, $SiO_2$ and C.

4. The magneto-resistive head as claimed in claim 1, wherein said non-magnetic insulator layer forms at least a portion of a reproducing gap which is used to reproduce information from a recording medium.

5. The magneto-resistive head as claimed in claim 1, which further comprises:

a magneto-resistive element provided on said non-magnetic insulator layer, said non-magnetic insulator layer forming a first gap layer;

a pair of conductor layers which is electrically conductive, each one of said pair of conductor layers being provided on said magneto-resistive element and said first gap layer;

a second gap layer made of a non-magnetic material which is electrically insulative, said second gap layer being provided on said magneto-resistive element and said pair of conductor layers; and an upper shield layer provided on said second gap layer.

6. The magneto-resistive head as claimed in claim 5, wherein a thickness of each of said first and second gap layers at a portion adjacent to said magneto-resistive element is smaller than that at other portions.

7. The magneto-resistive head as claimed in claim 5, wherein said magneto-resistive element comprises:

a magneto-resistive layer having two ends;

an intermediate layer provided on said magneto-resistive layer;

a soft magnetic layer provided on said intermediate layer and having two ends; and at least one pair of magnetic layers contacting said soft magnetic layer and said magneto-resistive layer for controlling magnetic domains.

8. The magneto-resistive head as claimed in claim 7, wherein said at least one pair of magnetic layers for controlling the magnetic domains comprises:

a pair of first magnetic layers arranged only on the two ends of said magneto-resistive layer; and a pair of second magnetic layers arranged only on the two ends of said soft magnetic layer.

9. The magneto-resistive head as claimed in claim 8, wherein an interval of the entire portion of said second magnetic layers located on the two ends of said soft magnetic layer is narrower than an interval of the entire portion of said first magnetic layers located on the two ends of said magneto-resistive layer.

10. The magneto-resistive head as claimed in claim 7, wherein at least one pair of said magnetic layers for controlling the magnetic domains is made of a magnetic material selected from a group consisting of antiferromagnetic materials, ferromagnetic materials, and permanent magnet materials.

11. A magneto-resistive head comprising:

a magneto-resistive layer having two ends;

an intermediate layer provided on said magneto-resistive layer;

a soft magnetic layer provided on said intermediate layer and having two ends; and at least one pair of magnetic layers contacting said soft magnetic layer and said magneto-resistive layer for controlling magnetic domains.

12. The magneto-resistive head as claimed in claim 11, wherein said at least one pair of magnetic layers for controlling the magnetic domains comprises:

a pair of first magnetic layers arranged only on the two ends of said magneto-resistive layer; and a pair of second magnetic layers arranged only on the two ends of said soft magnetic layer.

13. The magneto-resistive head as claimed in claim 12, wherein an interval of the entire portion of said second magnetic layers located on the two ends of said soft magnetic layer is narrower than an interval of the entire portion of said first magnetic layers located on the two ends of said magneto-resistive layer.

14. The magneto-resistive head as claimed in claim 11, wherein said at least one pair of magnetic layers for controlling the magnetic domains is made of a magnetic material selected from a group consisting of antiferromagnetic materials, ferromagnetic materials, and permanent magnet materials.

* * * * *